United States Patent
Erdem (10) Patent No.: US 6,731,287 B1
(45) Date of Patent: May 4, 2004

(54) METHOD FOR ANIMATING A 3-D MODEL OF A FACE

(75) Inventor: A. Tanju Erdem, Rochester, NY (US)

(73) Assignee: Momentum Bilgisayar, Yazilim, Danismanlik, Ticaret A.S., Istanbul (TK)

(*) Notice: Subject to any disclaimer, the term of this patent is extended or adjusted under 35 U.S.C. 154(b) by 498 days.

(21) Appl. No.: 09/689,566

(22) Filed: Oct. 12, 2000

(51) Int. Cl.$^7$ ................................................ G06T 17/00
(52) U.S. Cl. ...................................... 345/473; 345/418
(58) Field of Search ................................ 345/418, 419, 345/473, 474

(56) References Cited

U.S. PATENT DOCUMENTS

| | | |
|---|---|---|
| 4,975,960 A | 12/1990 | Petajan |
| 5,280,530 A | 1/1994 | Trew et al. |
| 5,744,953 A | 4/1998 | Hansen |
| 5,774,591 A | 6/1998 | Black et al. |
| 5,802,220 A | 9/1998 | Black et al. |
| 5,805,745 A | 9/1998 | Graf |
| 5,807,284 A | 9/1998 | Foxlin |
| 5,907,626 A | 5/1999 | Toklu et al. |
| 5,923,337 A | 7/1999 | Yamamoto |
| 5,982,909 A | 11/1999 | Erdem et al. |
| 6,009,210 A | 12/1999 | Kang |
| 6,016,148 A | 1/2000 | Kang et al. |
| 6,020,892 A | 2/2000 | Dillon |
| 6,028,960 A | 2/2000 | Graf et al. |
| 6,031,539 A | 2/2000 | Kang et al. |
| 6,037,949 A | 3/2000 | DeRose et al. |
| 6,047,078 A | 4/2000 | Kang |
| 6,052,132 A | 4/2000 | Christian et al. |
| 6,064,390 A | 5/2000 | Sagar et al. |

OTHER PUBLICATIONS

Antunes, Gabriel, et al., "MPEG–4 Facial Animation Technology: Survey, Implementation, and Results", *IEEE Transactions on Circuits and Systems for Video Technology*, vol. 9, No. 2, pp. 290–305, (1999).

Lavagetto, Fabio, et al., "The Facial Animation Engine: Toward a High–Level Interface for the Design of MPEG–4 Compliant Animated Faces", *IEEE Transactions on Circuits and Systems for Video Technology*, vol. 9, No. 2, pp. 277–289, (1999).

Waters, Keith, "A Muscle Model for Animating Three–Dimensional Facial Expression", *Computer Graphics* (SIGGRAPH 95), vol. 21, No. 4, pp. 17–24, (Jul. 1987)

(List continued on next page.)

*Primary Examiner*—Cliff N. Vo
(74) *Attorney, Agent, or Firm*—Thomas R. FitzGerald, Esq.

(57) ABSTRACT

A method for animating a 3-D model of a person's face is disclosed. The 3-D face model carries both the geometry (shape) and the texture (color) characteristics of the person's face. The shape of the face model is represented via a 3-D triangular mesh (geometry mesh), while the texture of the face model is represented via a 2-D composite image (texture image). A separate 3-D triangular mesh, called the shape mesh, is used to animate the nodes of the geometry mesh: Each triangle of the shape mesh controls the motion of a plurality of nodes of the geometry mesh that are connected to it. Thus, by moving the nodes of the shape mesh, which are small in number, the nodes of the geometry mesh, which can be very large in number, are animated realistically. The nodes of the shape mesh can be moved directly or indirectly. In the indirect method, the nodes of the shape mesh are moved in accordance with the so-called facial action values, which are even smaller in number than the nodes of the shape mesh.

8 Claims, 8 Drawing Sheets

OTHER PUBLICATIONS

Lee, Yuencheng, et al., "Realistic Modeling for Facial Animation", *Computer Graphics, (SIGGRAPH 95)*, Los Angeles, CA, pp. 55–63, (Aug. 1995).

Platt, Stephen M., et al., "Animating Facial Expressions", *Computer Graphics, (SIGGRAPH 81)*, vol. 15, No. 3, pp. 245–252, (Aug. 1981).

Tekalp, Murat, et al., "Face and 2–D Mesh Animation in MPEG–4", *Signal Processing: Image Communication*, vol. 15, No. 4–5, pp. 387–421, (Jan. 21, 2000).

Zitnick, Lawrence C. et al., "Manipulation of Video Eye Gaze and Head Orientation for Video Teleconferencing", *Microsoft Research Technical Report MSR–TR–99–46*, pp. 1–13, (Jun. 16, 1999).

Haratsch, Erich, et al., "An Animation Definition Interface", *International Workshop on Synthetic –Natural Hybrid Coding and Three Dimensional Imaging*, Rhodes, Greece, pp. 216–219, (Sep. 5–9, 1997).

Bregler, Christoph, et al., "Video Rewrite: Driving Visual Speech With Audio", *Computer Graphics (SIGGRAPH 97)*, pp. 1–8, (1997).

Escher, Marc, et al., "Automatic 3D Cloning and Real–Time Animation of a Human Face", *Proceedigs of Computer Animation*, Geneva, Switzerland, pp. 1–13, (1997).

METHOD FOR ANIMATING A 3-D MODEL OF A FACE

FIELD OF THE INVENTION

The present invention is related to the field of computer animation, and more specifically, to a technique for animating a personalized three-dimensional (3-D) model of a person's face in accordance with the facial motion of the person.

BACKGROUND OF THE INVENTION

The goal of facial animation is to mimic the facial motion of a person on a 3-D model of the person's face as accurately and as fast as possible. The accuracy of a facial animation method is measured by the realism of the animated face it generates. On the other hand, the computational speed of a facial animation method determines whether it can be realized in real-time. There are known techniques for using markers to track selected facial features such as the eyebrows, ears, mouth and corners of the eyes.

The 3-D model of a person's face is composed of a 3-D triangular mesh, referred to as the geometry mesh, and an associated composite image of the person's face, referred to as the texture image. A 3-D triangular mesh refers to a connected set of triangular patches in 3-D whose corners form the nodes of the mesh. Each triangular patch in the geometry mesh acquires its image data from an associated triangular region in the texture image. The geometry mesh represents the geometry of the person's face in its neutral state. Animating the 3-D face model of a person involves deforming the geometry mesh of the face model to reflect the changes in the geometry of the face caused by the motion of the face.

The methods disclosed in the prior art on facial animation can be generally classified as (i) physics-based methods and (ii) rule-based methods. In physics-based methods, the motion of each triangle of the geometry mesh is controlled by a multi-layer facial muscle system. Dynamic models of the facial muscles are employed to calculate the propagation of any facial force throughout the face and to obtain the resulting deformation of the surface of the face. Physics-based methods can produce realistic animations, however, because of their high computational cost, they cannot be used in real-time applications.

In rule-based methods, a subset of the nodes of the geometry mesh, referred to as feature points, are used to control the movement of the rest of the nodes of the geometry mesh. Each feature point is assigned an area of influence on the geometry mesh. When a feature point is moved, the nodes of the geometry mesh that belong to the area of influence of the feature point move according to some predefined deformation rules. These deformation rules may specify linear, piece-wise linear, or rotational motion for the nodes of the mesh with the amount of motion being inversely proportional to the distance of the node to its controlling feature point. Although the rule-based methods provide real-time deformations of the face, they may lack realism as they are not based on any physical model.

SUMMARY OF THE INVENTION

The present invention provides an improvement designed to satisfy the aforementioned needs. Particularly, the present invention is directed to a computer program product for animating a 3-D face model realistically and in real-time by performing the steps of: (a) receiving the 3-D face model of a person; (b) receiving the global and local facial motion values; and (c) animating the fine geometry mesh of the 3-D face model using a sparse shape mesh overlaying the geometry mesh.

BRIEF DESCRIPTION OF THE DRAWINGS

In the course of the following detailed description, reference will be made to the attached drawings in which.

DETAILED DESCRIPTION OF THE INVENTION

Figure 1:
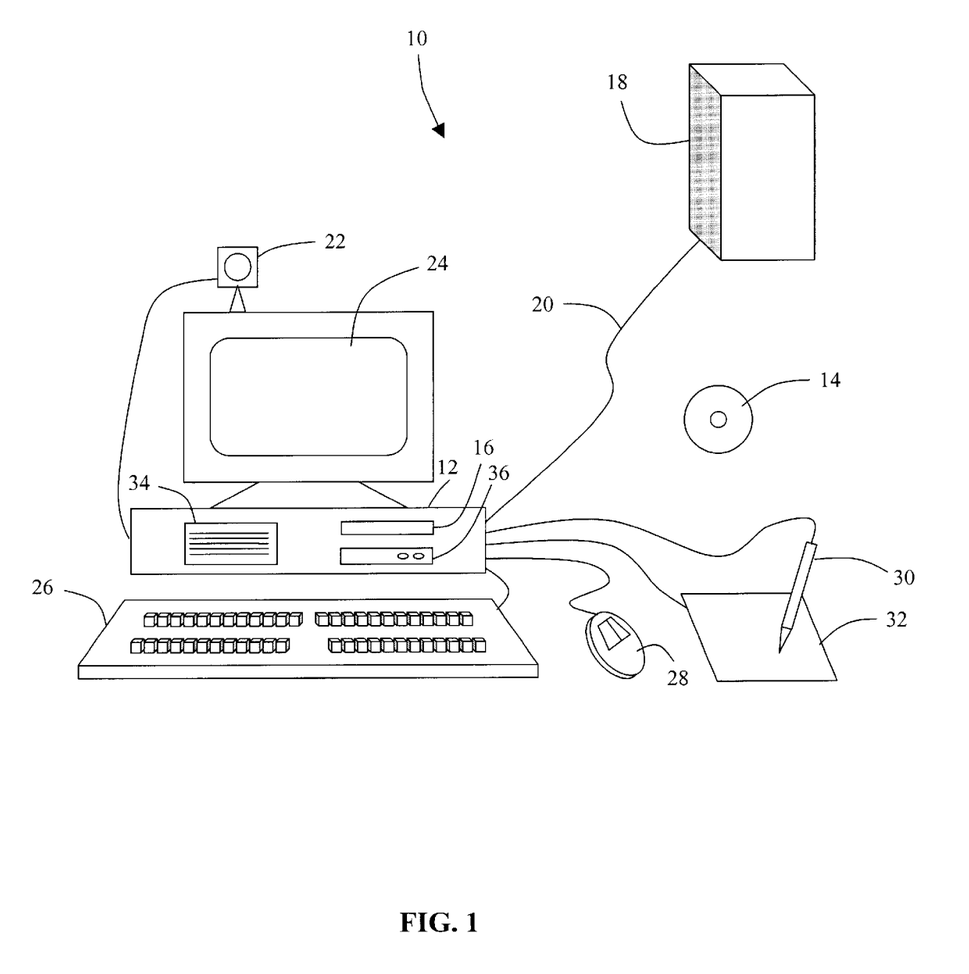
FIG. 1 is a perspective view of a computer system for implementing the present invention.

Referring to FIG. 1, there is illustrated a computer system 10 for implementing the present invention. The computer system 10 includes a microprocessor-based unit 12 for receiving and processing software programs and for performing other well known processing functions. The software programs are contained on a computer useable medium 14, typically a compact disk, and are input into the microprocessor-based unit 12 via the compact disk player 16 electronically connected to the microprocessor-based unit 12. As an alternate to using the compact disk 14, programs could also be contained in an Internet server 18 and input into the microprocessor-based unit 12 via an Internet connection 20. A camera 22 is electronically connected to the microprocessor-based unit 12 to capture the 2-D images of a person's face. A display 24 is electronically connected to the microprocessor-based unit 12 for displaying the images and user related information associated with the software. A keyboard 26 is connected to the microprocessor based unit 12 for allowing a user to input information to the software. A mouse 28 is also connected to the microprocessor based unit 12 for selecting items on the display 24 or for entering 2-D position information to the software, as is well known in the art. As an alternate to using the mouse 28, a digital pen 30 and a digital pad 32 may be used for selecting items on the display 24 and entering position information to the software. The output of the computer system is either stored on a hard disk 34 connected to the microprocessor unit 12, or uploaded to the Internet server 18 via the Internet connection 20. Alternatively, the output of the computer system can be stored on another computer useable medium 14, typically a compact disk, via a compact disk writer 36.

Figure 2:
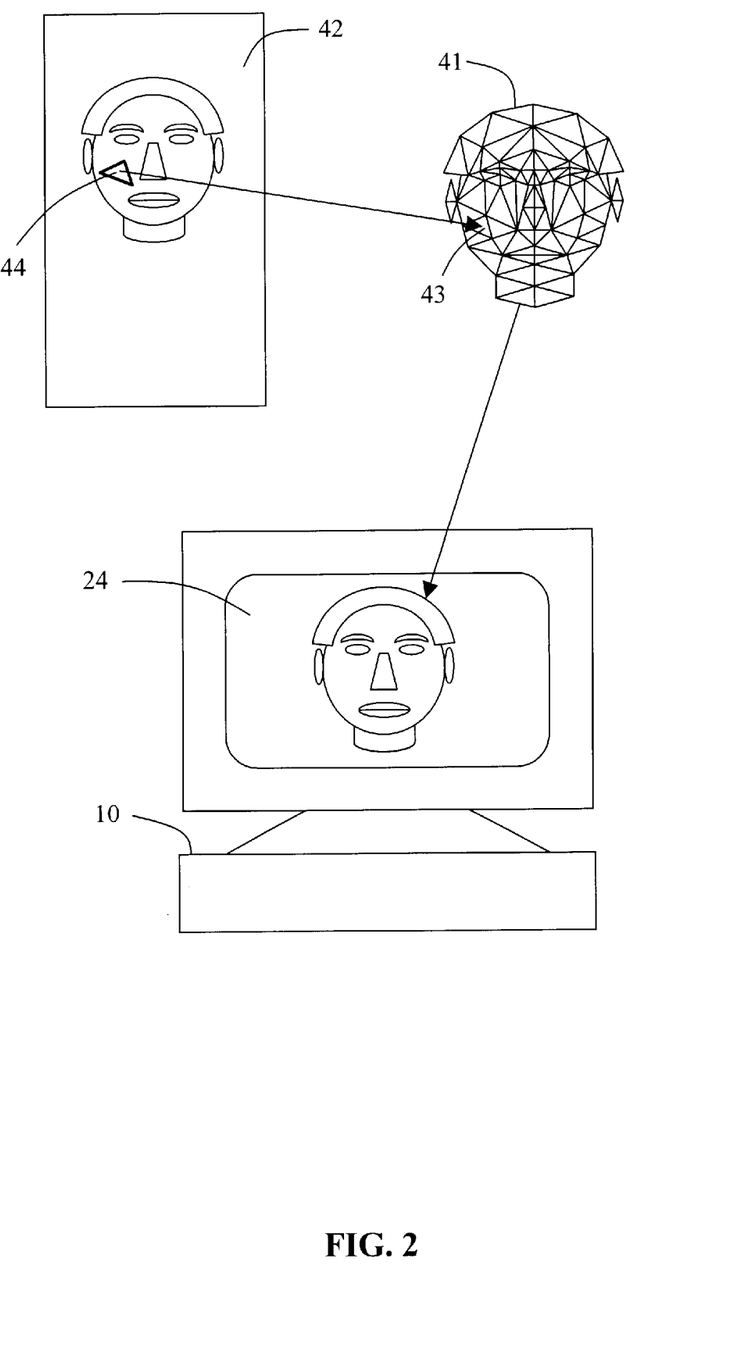
FIG. 2 is a diagram illustrating the method of present invention.

The below-described steps of the present invention are implemented on the computer system 10. Before describing the steps of the present invention, it will facilitate understanding to have an understanding of the following terms. Referring to FIG. 2, 3-D face model is composed of a 3-D triangular mesh (geometry mesh) 41 and a 2-D composite image (texture image) 42. 3-D triangular mesh refers to a connected set of triangular patches in 3-D whose corners form the nodes of the mesh. Each triangular patch 43 in the geometry mesh 41 is associated with a triangular region 44 in the texture image 42. In order to render the face model of a person on the display 24 of the computer system 10, the outside surface of each triangular patch 43 in the geometry mesh 41 is painted with the image data contained in its corresponding triangle 44 in the texture image 42. Image data are transferred from a triangle 44 in the texture image 42 to its counterpart 43 in the geometry mesh 41 via an affine transform which is well known to anyone knowledgeable in the field of computer graphics. Although we have disclosed triangular meshes, those skilled in the art will understand that any other polygonal mesh could be substituted for the triangular mesh.

Figure 3:
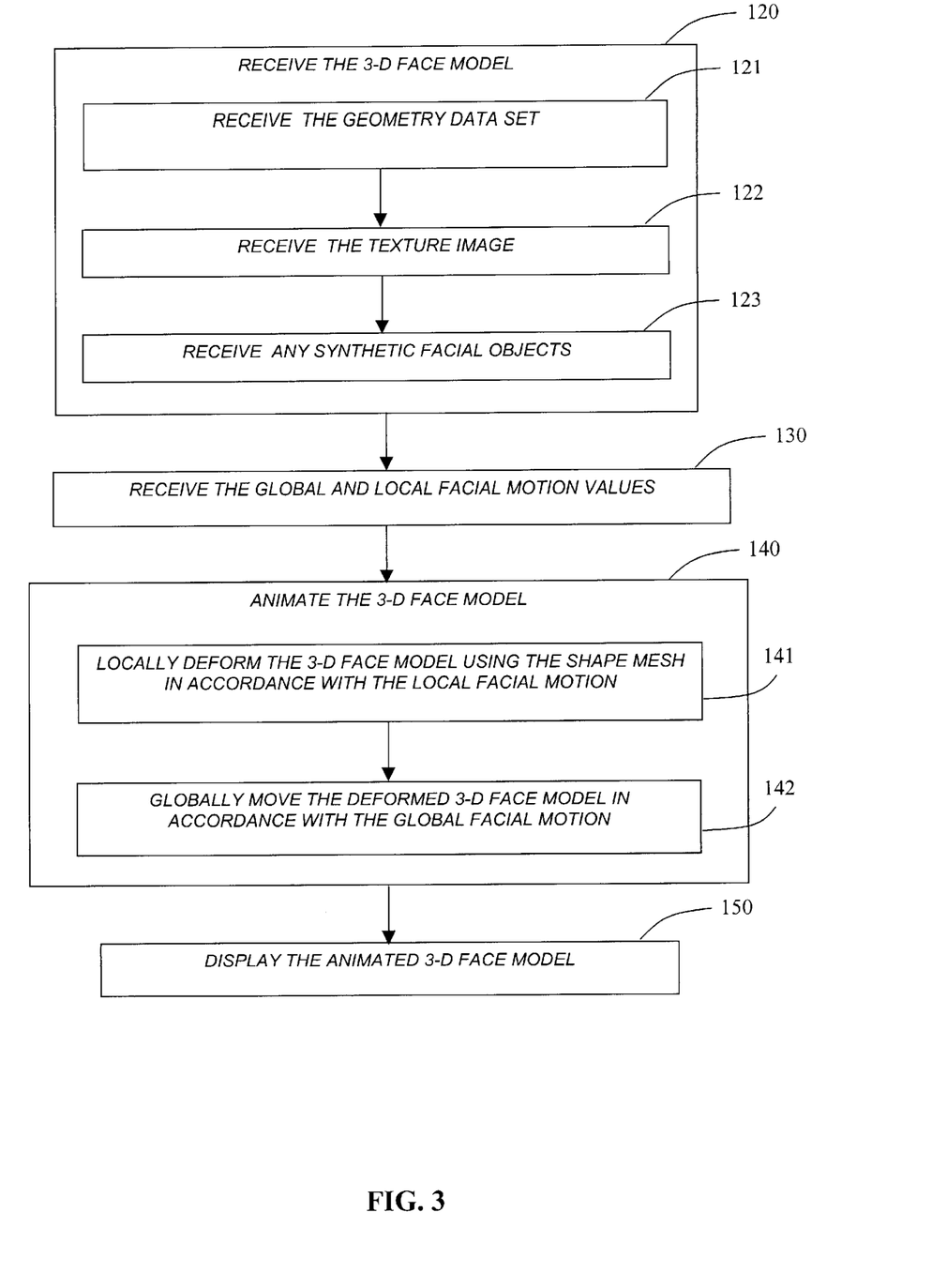
FIG. 3 is a flowchart for the method of the present invention.

Referring to FIG. 3, there are illustrated the five steps of the present invention which are first succinctly outlined and later described in detail. Briefly stated, the four steps are as follows: (a) receiving the 3-D face model of a person (Step 120); (b) receiving the global and local facial motion values (Step 130); (c) animating the 3-D face model using the shape mesh and the facial motion values (Step 140); (d) displaying the animated 3-D face model (Step 150).

A. Receiving the 3-D Face Model (Step 120)

Referring to FIG. 3, the method of receiving the 3-D face model of the person comprises the steps of (1) receiving the geometry data set (Step 121); (2) receiving the texture image (Step 122); and (3) receiving any synthetic facial objects (Step 123). In the following, a detailed description of these steps is given A1. Receiving the Geometry Data Set (Step 121)

Figure 4:
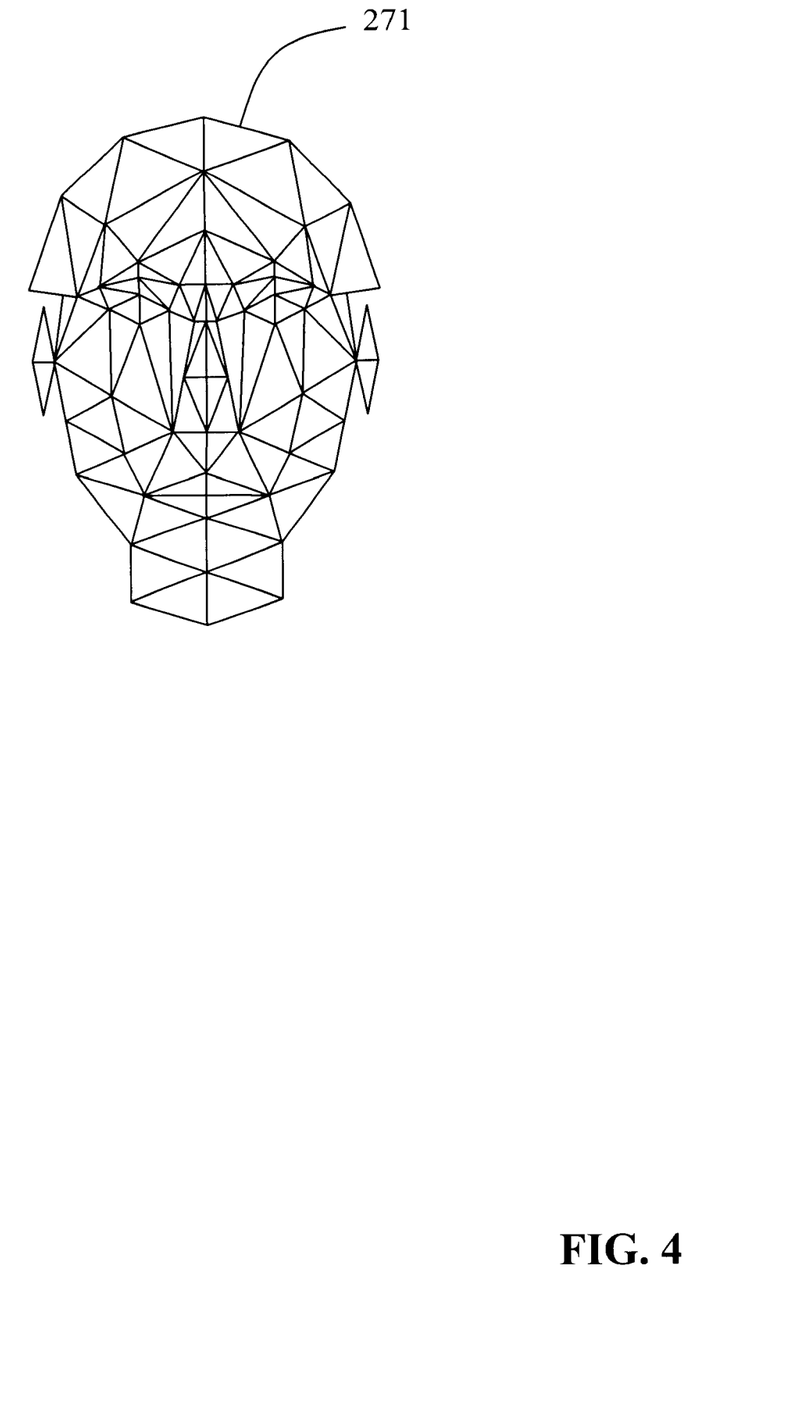
FIG. 4 is a diagram illustrating the method of receiving the geometry data set.

The geometry data set for a 3-D face model consists of an initial geometry mesh, a shape mesh, the positions of the nodes of the shape mesh for the neutral state and the action states of the face, and the attachment coefficients for the geometry mesh. An itemized description of the aforementioned components of the geometry data set is given in the following:

1. Initial geometry mesh: Referring to FIG. 4, the topology of the geometry mesh 271 is received as part of the geometry data set. Hence, what is received as the first item is the number of nodes and triangles of the geometry mesh 271, and the information of how they are connected.

Figure 5:
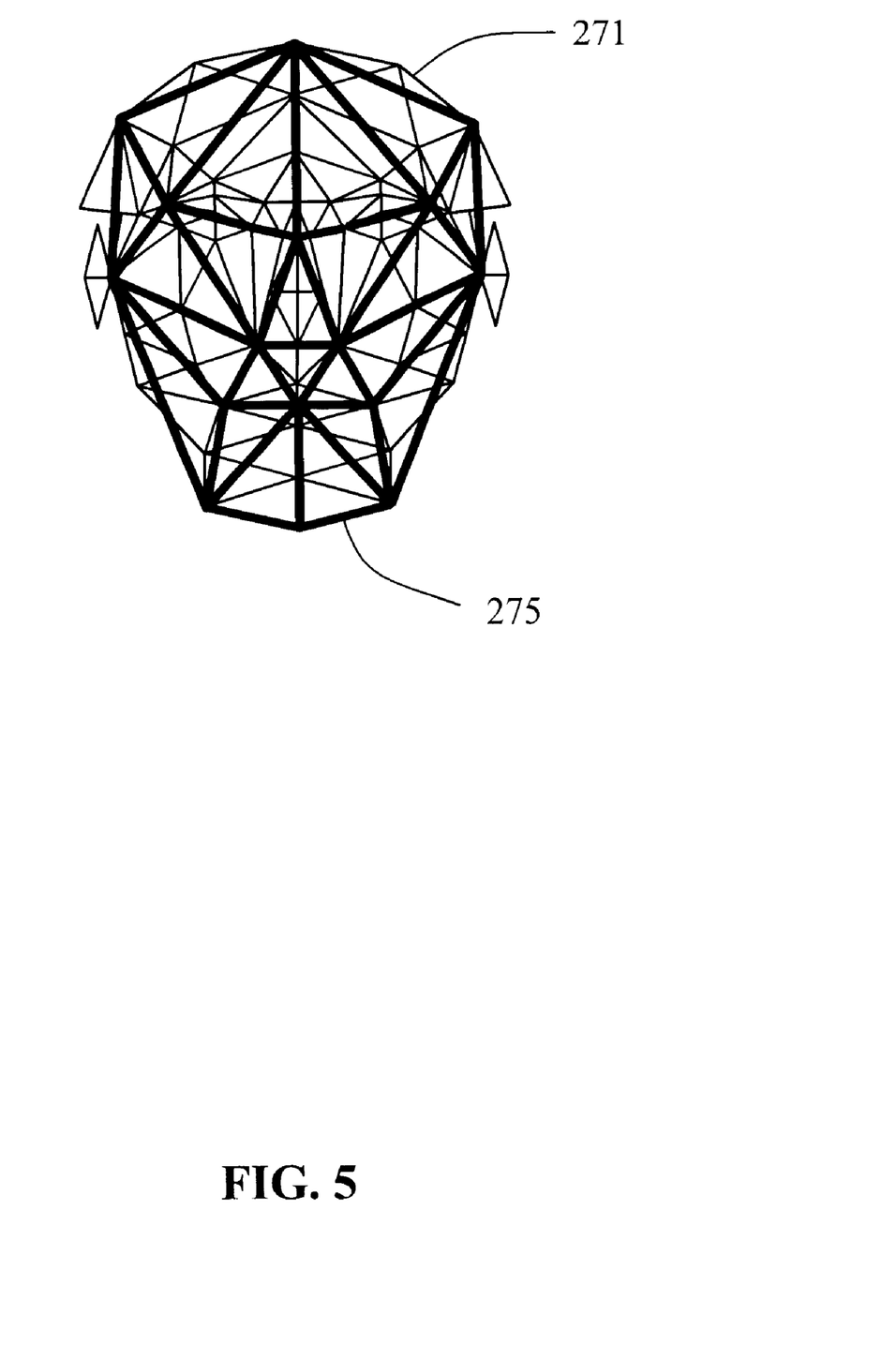
FIG. 5 is a diagram further illustrating the method of receiving the geometry data set.

2. Shape meshes for the neutral and action faces: Referring to FIG. 5, the shape mesh 275 is a lower resolution (coarser) triangular mesh overlying the geometry mesh 271 and comprising substantially fewer and larger triangular patches than the geometry mesh 271. The shape mesh 275 is used for setting the coordinates of the nodes of the geometry mesh 271 for the neutral face. The shape mesh 275 is also used for animating the geometry mesh 271 in accordance with the motion values. Neutral face means that all face muscles are relaxed, eyes are normally open, mouth is closed and lips are in contact. Action faces refer to maximum motions of regions of the face such as during smiling or being surprised.

Figure 6:
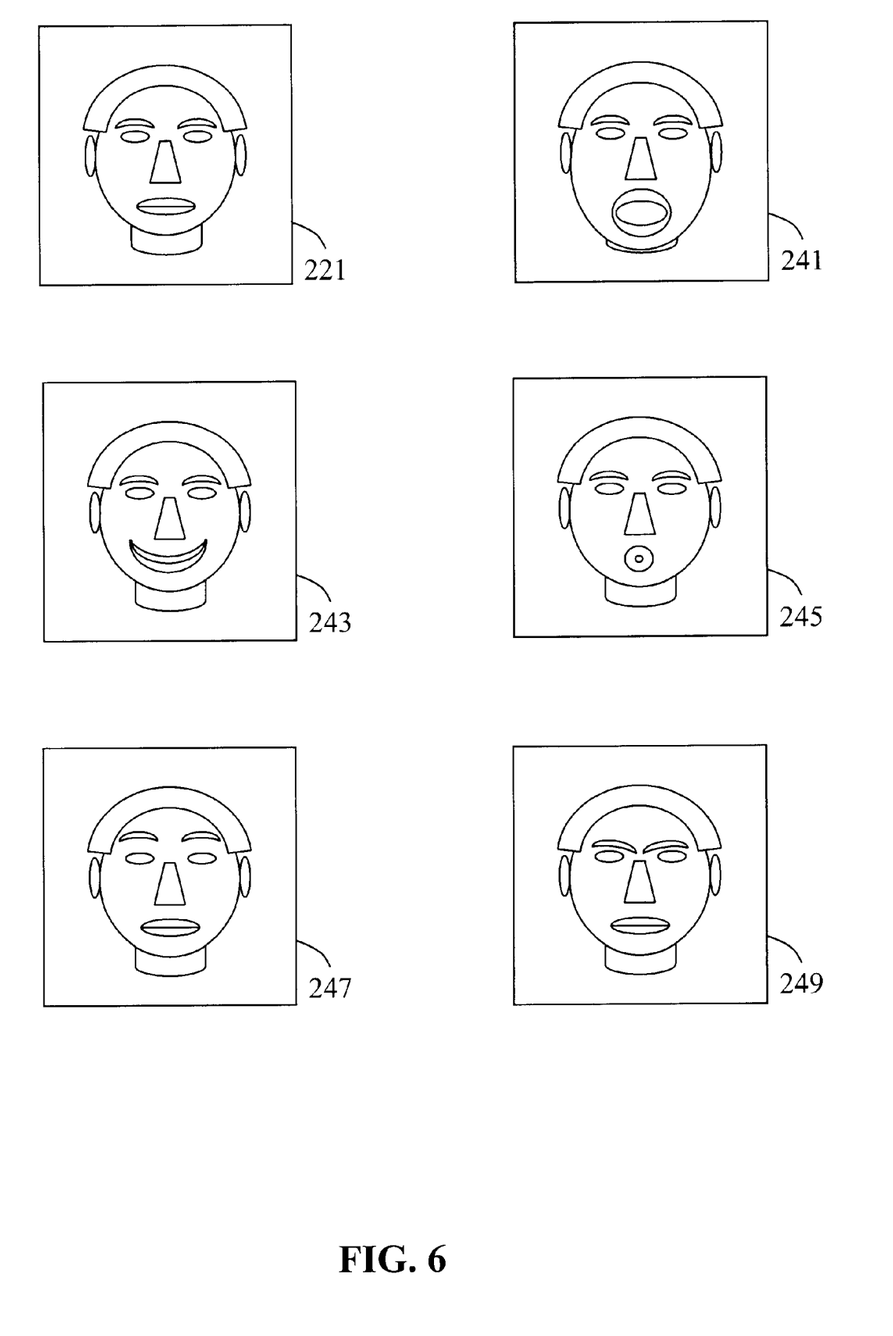
FIG. 6 is a diagram illustrating the action faces used for animation.

Referring to FIG. 6, in a preferred embodiment of the invention there are a total of 5 action states for the face, namely, yawning-mouth 241, smiling-mouth 243, kissing-mouth 245, raised-eyebrows 247, and squeezed-eyebrows 249, in addition to the neutral state 221 of the face. In mathematical terms, let K denote the number of nodes of the shape mesh 275 and let $D_n$, n=1, . . . , K, denote the positions of the nodes of the shape mesh 275 for the neutral face 221. Let H denote the number of action faces and $D_{n,i}$, i=1, . . . H, denote the positions of the nodes of the shape mesh 275 for the action faces. Hence, what is received in the second step as part of the geometry data set is the topology of the shape mesh 275 and the coordinates of the nodes of the shape mesh for the neutral face $D_n$, n=1, . . . , K, and optionally for the action faces $D_{n,i}$, i=, 1, . . . , H.

Figure 7:
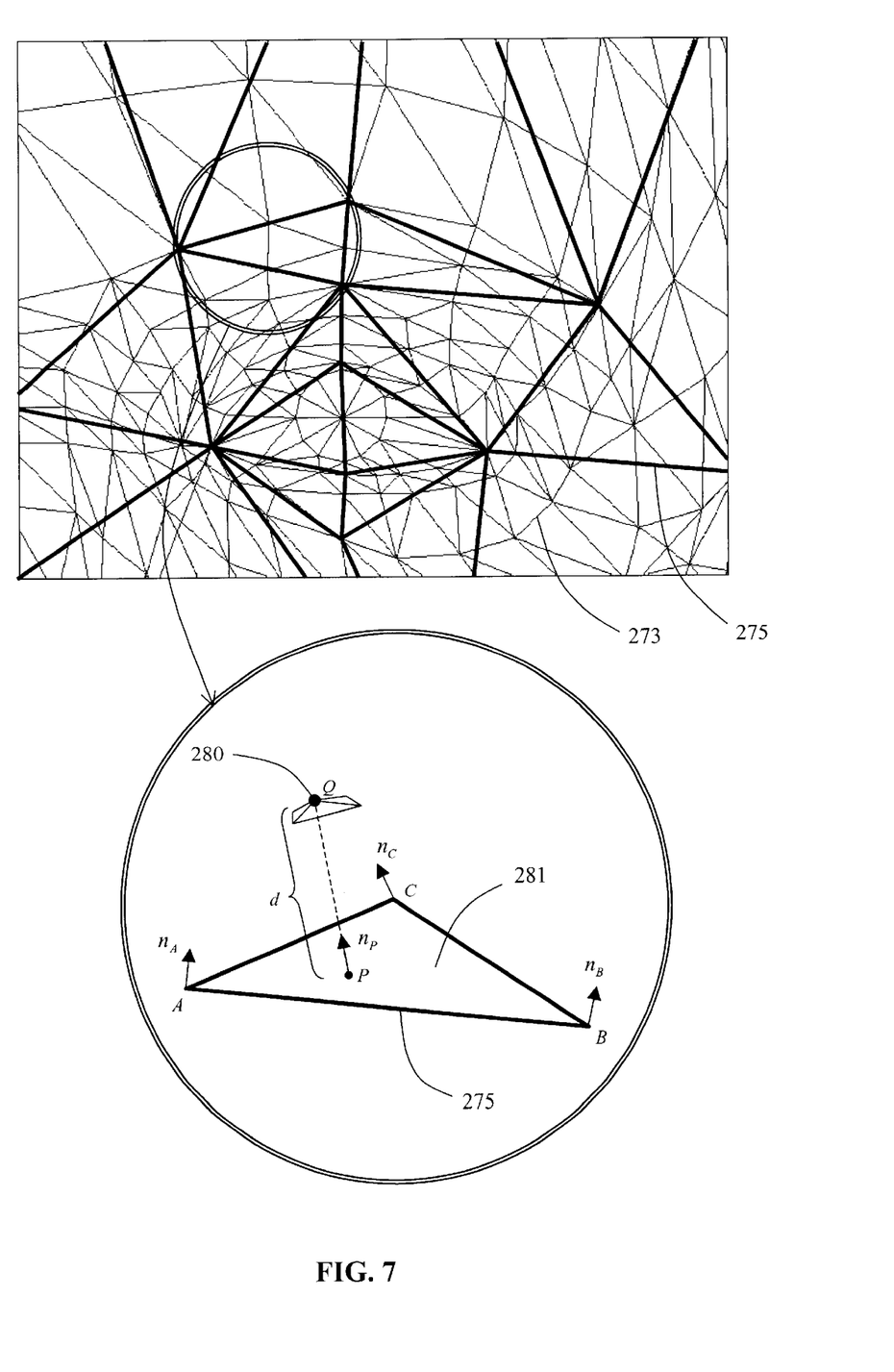
FIG. 7 is a diagram illustrating the method of attaching the geometry mesh to the shape mesh.

3. Attachment coefficients: Referring to FIGS. 4 and 7, the attachment coefficients are used to attach the geometry mesh 271 to the shape mesh 275 to obtain the geometry mesh 273 adapted for the person. The attachment method is such that a node 280 of the geometry mesh 273 is attached to a triangle 281 of the shape mesh 275 if there is a point on the triangle 281 such that the line passing through the node 280 and the point is parallel to the surface normal vector $n_p$ at the point. Still referring to FIG. 7, the node 280 of the geometry mesh 273 located at Q is attached to the triangle 281 of the shape mesh 275 because the line passing through Q and P is parallel to $n_p$. Then, it is said that the node Q 280 is attached to the triangle ABC 281 at the point P. This attachment is quantified by five numbers, namely the weights α, β, γ, the distance d between the node Q 280 and the attachment point P, and the index m of the triangle 281. Hence α, β γ, d, and m are referred to as the attachment coefficients. The 3-D position of the node Q 280 is expressed as $$Q = \alpha A + \beta B + \gamma C + dn$$

where A, B, and C denote the positions of the corners of the triangle 281, and n is obtained as a normalized weighted average of the normal vectors $n_A$, $n_B$ and $n_C$ at the corners A, B, and C, respectively, of the shape triangle 281 as follows:

$$n = \frac{\alpha n_A + \beta n_B + \gamma n_C}{\|\alpha n_A + \beta n_B + \gamma n_C\|}.$$

A different set of attachment coefficients is received for each node of the geometry mesh 273 as part of the geometry data set. In mathematical terms, let L denote the number of nodes in the geometry mesh 271. Then, the attachment coefficients are denoted by $\alpha_k$, $\beta_k$, $\gamma_k$, $d_k$, and $m_k$ for k=1, . . . , L. Hence what is received in the third step is the attachment coefficients $\alpha_k$, $\beta_k$, $\gamma_k$, $d_k$, and $m_k$ for the nodes of the geometry mesh 273.

A2. Receiving the Texture Image (Step 122)

The texture image is used to paint the surface of the geometry mesh of the person. The texture image may consist of a single image, a mosaic of multiple images, or simply a concatenation of multiple images. Associated with the texture image, affine transformations are also received for every triangle of the geometry mesh 273. The affine transformations are used to map the texture image data onto the triangles of the geometry mesh 273 as is well known to anyone in the field of computer graphics.

A3. Receiving any Synthetic Facial Objects (Step 123)

The face model may include synthetic objects such as eyeglasses and earrings. A 3-D mesh model of a pair of eyeglasses is selected from a collection of eyeglasses as indicated by an eyeglasses identifier, if the face model includes eyeglasses. Similarly, a 3-D mesh model of a pair of earrings is selected from a collection of earrings as indicated by an earrings identifier, if the face model includes earrings. The 3-D meshes of the synthetic components are attached to the geometry mesh of the face to obtain the complete face model of the person.

B. Receiving the Global And Local Facial Motion Values (Step 130)

Referring to FIG. 3, in the third step of the invention, the global and local motion values for animating the 3-D face model are received in a chronological order. The global motion is represented by the 3-D rotation matrix $R^f$ and the 3-D position vector $T^f$. The superscript f denotes the chronological order number for the motion values.

The local motion is represented by the 3-D position values $D^f_n$, n=1, ..., K, of the nodes of the shape mesh 275. The superscript f denotes the chronological order number for the position values, and K denotes the number of nodes in the shape mesh 275. The position values $D_n^f$ are either received directly or indirectly. In the indirect method, the action vectors $A^f$ are received instead, and the position values are calculated from the action vectors using the following matrix-vector equation:

$$D_n^f = [D_{n,1} - D_n \ldots D_{n,H} - D_n] \cdot A^f + D_n,$$

where $D_n$ denotes the positions of the nodes of the shape mesh 275 for the neutral face 221, and $D_{n,i}$ for i=1, ..., H, denote the positions of the nodes of the shape mesh 275 for the action faces. It facilitates understanding to note that the matrix in the equation above has dimension K×H.

In a preferred embodiment of the invention, there are a total of 5 action faces, i.e., H=5, and $D_{n,1}$, $D_{n,2}$, $D_{n,3}$, $D_{n,4}$, and $D_{n,5}$ for n=1, ..., K denote the positions of the nodes of the shape mesh 275 for the action faces yawning-mouth 241, smiling-mouth 243, kissing-mouth 245, raised-eyebrows 247, and squeezed-eyebrows 249, respectively. Likewise, the action vector A has 5 components:

$$A = (A_{MY}, A_{MS}, A_{MK}, A_{ER}, A_{ES})$$

$A_{MY}$ being the amount of yawning-mouth action, $A_{MS}$ being the amount of smiling-mouth action, $A_{MK}$ being the amount of kissing-mouth action, $A_{ER}$ being the amount of raised-eyebrows action, and $A_{ES}$ being the amount of squeezed-eyebrows action. For example, action state i=1 corresponds to yawning-mouth and has action vector A=(1.0, 0.0, 0.0, 0.0, 0.0), action state i=4 corresponds to raised-eyebrows and has action vector A=(0.0, 0.0, 0.0, 0.0, 1.0), and action vector A=(0.5, 0.0, 0.0, 1.0, 0.0) represents a half-yawning mouth and fully raised eyebrows. Still referring to FIG. 7, the neutral state of the face 221 is represented by the action vector A=(0.0, 0.0, 0.0, 0.0, 0.0).

C. Animating the 3-D Face Model (Step 140)

Referring to FIG. 3, the method of animating the 3-D face model comprises the steps of (1) locally deforming the 3-D face model using the shape mesh in accordance with the local facial motion (Step 141); and (2) globally moving the deformed 3-D face model in accordance with the global facial motion (Step 142). In the following, a detailed description of these steps is given.

D1. Locally Deforming the 3-D Face Model using the Shape Mesh In Accordance with the Local Facial Motion (Step 141)

Figure 8:
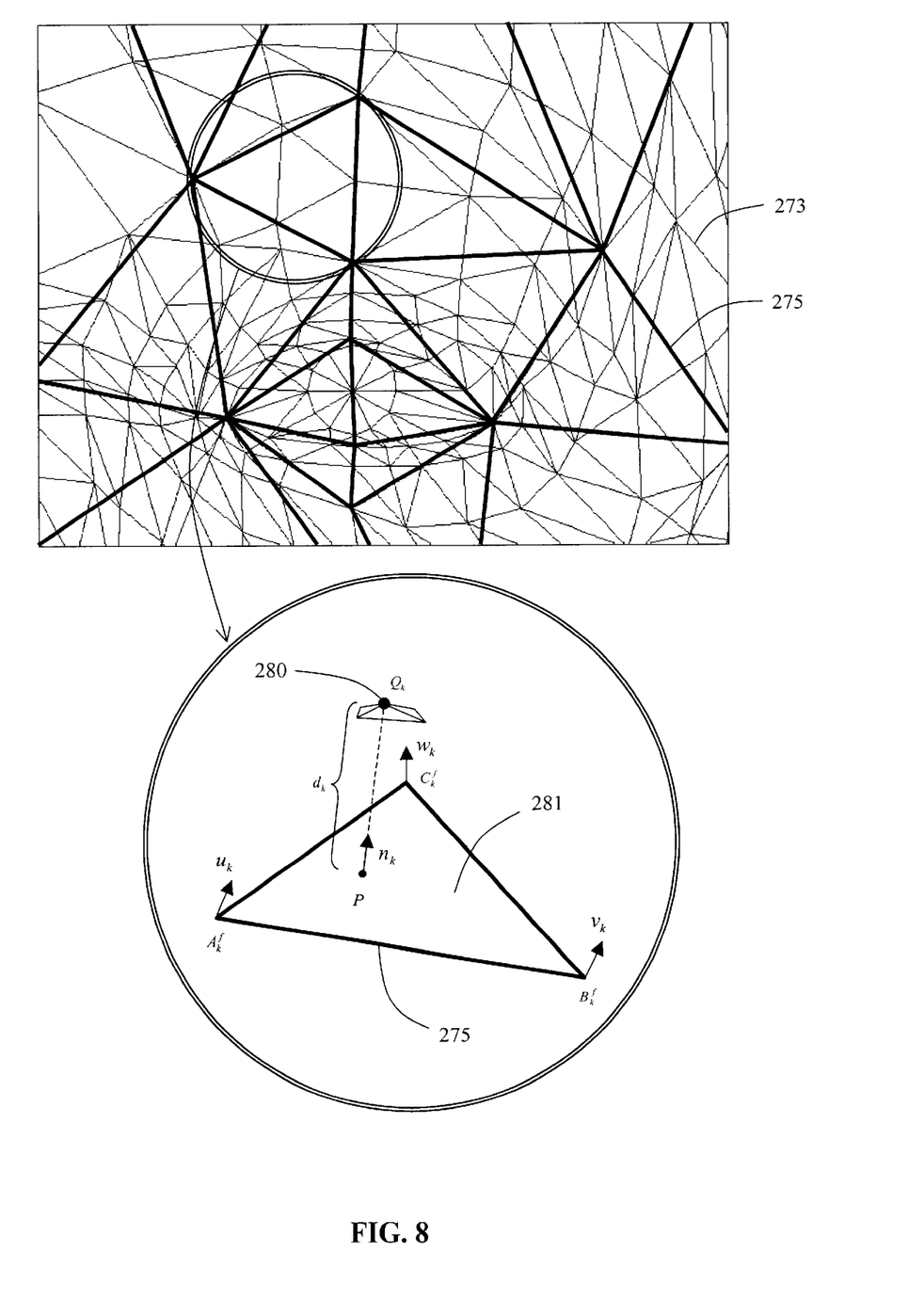
FIG. 8 is a diagram illustrating the method of animating the face using the shape mesh.

Referring to FIG. 8, given the received attachment coefficients $\alpha_k$, $\beta_k$, $\gamma_k$, $d_k$, and $m_k$ for k=1, ..., L, for the nodes of the geometry mesh 273, and the moved 3-D position values $D_n^f$, n=1, ..., K, of the nodes of the shape mesh 275 in the chronological order, the following procedure is used to animate the adapted geometry mesh 273:

1. Calculate the normal vectors at the nodes of the shape mesh 275: Still referring to FIG. 8, the normal vector n at a node of the shape mesh 275 is obtained by averaging the surface normals of all the triangles of the shape mesh 275 that have the node as one of their corners. The result of the averaging is normalized so that the normal vector n has unit length.

2. Calculate the animated 3-D positions of the nodes of the geometry mesh 273: Still referring to FIG. 8, the location P on the triangle 281 where the node 280 is attached to is calculated as follows. Let $a(m_k)$, $b(m_k)$, and $c(m_k)$ denote the indices of the nodes of the triangle of the shape mesh 275 indicated by the index $m_k$. Likewise, let $A_k^f$, $B_k^f$, and $C_k^f$ denote the 3-D positions and let $u_k$, $v_k$, and $w_k$ denote the normal vectors of the nodes of the triangle of the shape mesh 275 indicated by the index $m_k$. Hence, the following equations can be written:

$$A_k^f = D_{a(m_k)}^f, \quad B_k^f = D_{b(m_k)}^f, \quad \text{and} \quad C_k^f = D_{c(m_k)}^f;$$

$$n_k = \frac{\alpha_k u_k + \beta_k v_k + \gamma_k w_k}{\|\alpha_k u_k + \beta_k v_k + \gamma_k w_k\|}.$$

Then, the locally animated location $Q_k$ for the geometry node k is given by $$Q_k = \alpha_k A_k^f + \beta_k B_k^f + \gamma_k C_k^f + d_k n_k.$$

D2. Globally Moving the Deformed 3-D Face Model in Accordance with the Global Facial Motion (Step 142)

Once the local deformations are realized on the geometry mesh 273, it is rotated according to the 3-D rotation matrix $R^f$ and positioned according to the 3-D position vector $T^f$. Thus the globally and locally animated location $S_k$ for the geometry node k is given by $$S_k = R^f Q_k + T^f.$$

D. Displaying the Animated 3-D Face Model (Step 150)

The animated 3-D face model is obtained by painting the animated geometry mesh obtained in Step 140 with the received texture image and affine mapping data, and adding the received synthetic facial objects such as eyeglasses and earrings, if any. The animated 3-D face model of a person is displayed on the monitor 24 of the computer system 10 for being viewed by the same and/or other persons.

What is claimed is:

1. A method for controlling a first mesh representative of fine features of an object with a second mesh representative of coarse features of the object comprising the steps of:
    attaching the fine mesh with a first set of nodes to the coarse mesh with a second set of nodes, deforming the fine mesh using the coarse mesh; receiving data signals representative of movements of the nodes of the coarse mesh; and moving the coarse mesh in accordance with the received data signals in order to animate the fine mesh.

2. A method for animating a 3-D object model comprising the steps of:

providing a 3-D object model having a fine 3-D geometry mesh with a first set of nodes, a coarse 3-D shape mesh with a second set of nodes, and a set of five attachment coefficients for each node of the fine 3-D geometry mesh, the five coefficients including one coefficient for triangle index, three coefficients for interpolation weights, and one coefficient for surface distance;

attaching the fine geometry mesh to the coarse shape mesh in accordance with the attachment coefficients;

receiving global and local motion values for deforming the 3-D shape mesh;

animating the 3-D geometry mesh of the 3-D object model using the 3-D shape mesh in accordance with the received global and local motion values; and displaying the animated 3-D object model.

3. The method of claim 2 wherein the step of attachment comprises:

assigning each node of the geometry mesh to a triangle of the shape mesh indicated by the triangle index coefficient for the node;

obtaining an attachment point for the node of the geometry mesh on the assigned triangle of the shape mesh, where the attachment point is defined as a weighted average of the coordinates of the corners of the assigned triangle using the interpolation weights coefficients provided for the node;

calculating a surface normal of the shape mesh at the attachment point as a weighted average of the normal vectors at the corners of the assigned triangle using the interpolation weights coefficients provided for the node; and obtaining the location of the node by adding to the attachment point a surface vector defined as the surface distance coefficient times the surface normal of the shape mesh at the attachment point.

4. The method of claim 2 wherein the global motion values comprise 3-D orientation and 3-D position data of the geometry mesh and the local motion values comprise 3-D displacements of the nodes of the shape mesh.

5. The method of claim 4 wherein the step of animating comprises moving nodes of the shape mesh in accordance with the received 3-D displacement data;

calculating surface normals of the shape mesh at attachment points of all nodes of the geometry mesh;

obtaining locations of the nodes of the geometry mesh by adding to their attachment points a surface vector defined as the surface distance coefficient times the surface normal of the shape mesh at respective attachment point; and rotating and positioning the geometry mesh in accordance with the received global orientation and position data.

6. The method of claim 2 wherein the global motion values comprise 3-D orientation and 3-D position data of the geometry mesh and the local motion values comprise action vectors for the shape mesh.

7. The method of claim 6 wherein the step of animating comprises:

calculating 3-D displacement data for the shape mesh in accordance with the received action vectors;

moving nodes of the shape mesh in accordance with the received 3-D displacement data;

calculating surface normals of the shape mesh at attachment points of all nodes of the geometry mesh;

obtaining locations of the nodes of the geometry mesh by adding to their attachment points a surface vector defined as the surface distance coefficient times the surface normal of the shape mesh at respective attachment point; and rotating and positioning the geometry mesh in accordance with the received global orientation and position data.

8. The method of claim 1 wherein the object is a face.

* * * * *